June 27, 1961  R. S. GRESKO  2,989,978
CONDENSATE DRAIN AND ANTIFREEZE INJECTOR
Filed Nov. 14, 1958
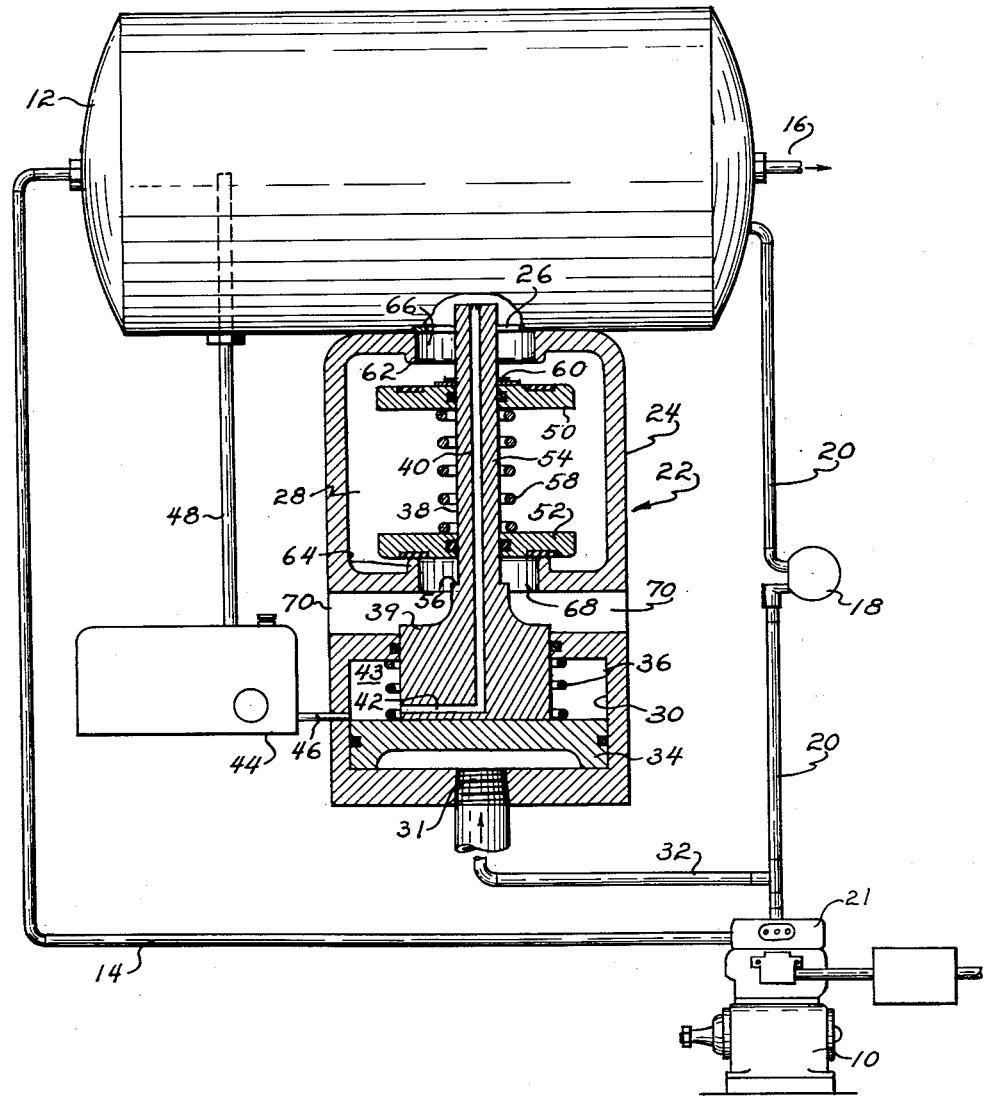
INVENTOR
RAYMOND S. GRESKO
BY Scrivener & Parker
ATTORNEYS

# United States Patent Office 2,989,978
Patented June 27, 1961

2,989,978
CONDENSATE DRAIN AND
ANTIFREEZE INJECTOR
Raymond S. Gresko, Elyria, Ohio, assignor to Bendix-Westinghouse Automotive Air Brake Company, Elyria, Ohio, a corporation of Delaware
Filed Nov. 14, 1958, Ser. No. 774,027
7 Claims. (Cl. 137—204)

This invention relates to fluid pressure systems and more particularly to means for automatically draining condensate from a pressure reservoir of a fluid pressure system, a particular feature of the invention residing in means cooperating with the drain means for injecting into the reservoir antifreeze solution at periodic intervals.

Condensate which collects in air pressure systems and particularly in the pressure reservoir tends to fill the reservoir so as to decrease its capacity and frequently the condensate is carried over into the system to collect on valve mechanisms and the like where, during cold weather, the condensate freezes and renders the pressure operated mechanisms inoperative. Heretofore, drainage of condensate has usually been accomplished by the manual opening of draincocks but this is often neglected, sometimes resulting in serious accidents particularly to automotive equipment.

One of the objects of the present invention is to provide a fluid pressure system constituted in such a manner as to avoid the above mentioned difficulties.

A further object of the invention is to provide a fluid pressure system arranged so as to automatically and periodically eliminate the condensate without any thought or intention on the part of the operator.

A further object of the invention is to eliminate any difficulties with the automatic drain means or with other mechanisms caused by ice by providing means for injecting into the reservoir antifreeze solution concurrently with the operation of the drain means.

Another object of the invention is to provide means for automatically draining condensate from a reservoir and concurrently injecting antifreeze solution into the reservoir, said means being inexpensive and capable of being readily installed on existing equipment.

Other objects and their attendant advantages will become apparent when the following description is read in conjunction with the accompanying single figure which is a diagrammatic view partly in section, showing a fluid pressure system illustrative of the present invention.

Referring now to the drawing, an arrangement embodying the principles of the present invention is disclosed as including a compressor 10 which may be driven by the engine of an automotive vehicle, not shown, such compressor supplying fluid under pressure to a suitable reservoir 12 through a conduit 14. The reservoir 12 is connected by an outlet 16 to any suitable mechanism, not shown, such as a brake valve.

In fluid pressure systems of this type as applied to automotive vehicles, the compressor operates continuously as long as the engine is operated and in order to avoid pumping excessive pressure into the reservoir the compressor is periodically controlled by unloading mechanism, well-known in the art, controlled by a governor responsive to predetermined high and low pressures in the reservoir. In the system illustrated the governor, indicated by the numeral 18, is connected in a line 20 extending between the reservoir 12 and the compressor unloading mechanism 21. As is known, when the reservoir pressure reaches its predetermined high value the governor 18 admits reservoir pressure to the unloader mechanism to unload the compressor and when the reservoir pressure falls to a predetermined low value, the governor closes the connection between the reservoir and the unloader mechanism and simultaneously exhausts fluid pressure from the latter to render it inoperative and thus enable the compressor to again pump air through the line 14 into the reservoir.

The system so far described is in all respects conventional and in accordance with the present invention, means are provided for automatically and periodically exhausting to atmosphere condensate collected in the reservoir 12 whenever the compressor is unloaded with means also being provided for injecting antifreeze into the reservoir concurrently with the discharge of the condensate.

The means provided by the invention for accomplishing the foregoing comprises a combined valve means and pump 22 preferably housed in a single casing 24 which is adapted to be connected to the bottom of the reservoir 12 in registry with a suitable aperture 26 through the reservoir wall. The housing 24 is divided into an upper valve chamber 28 and a lower piston chamber 30 with the latter having an inlet port 31 in its bottom wall which is connected by a branch conduit 32 to the unloader conduit 20. Contained within the piston chamber 30 is a piston 34 which is normally urged by a spring 36 to its lower deactivated position illustrated in the drawing.

A plunger 38 is centrally connected to the upper side of the piston by an enlarged base portion 39 which projects through a sealed aperture in the upper wall of piston chamber 30 with the plunger 38 extending upwardly therefrom to pass through the valve chamber 28 and into the reservoir 12. The enlarged base portion 39 may be an integral part of piston 34 or it may be a separate member integrally connected to the piston by any suitable means well known in the art. An axial passage 40 in plunger 38 and a radial cross-passage 42 in base 39 serve to connect the interior of the reservoir 12 with the space or cavity 43 in the chamber 30 above the piston 34. Also connected to this space is an antifreeze supply tank 44 having an outlet conduit 46 which serves to feed antifreeze from the tank 44 to the space 43. Inasmuch as cavity 43 is maintained at reservoir pressure by means of passages 40, 42, the tank 44 is hermetically sealed and also connected to the reservoir 12 by a conduit 48 so that reservoir pressure prevails at all times both in the tank 44 and in the space 43 to subject the antifreeze to equal pressure in all directions so that it can flow freely by gravity into the space 43 when the piston is in its normal down position. The under side of the piston, being connected to the governor controlled unloader line 20 and having greater motive area than the upper side because of base 39, is moved upwardly whenever the governor is actuated by high pressure in the reservoir 12 to admit reservoir pressure to the unloader. After only slight upward movement, the upper edge of the piston cuts off the tank conduit 46 and as the piston continues to travel upwardly it tends to compress the antifreeze trapped in space 43 so that the antifreeze is ejected upwardly through passages 42, 40 into the reservoir 12.

The condensate drain portion of the invention comprises in part a pair of spaced valve members 50, 52 slidingly carried on the upper portion 54 of plunger 38 and movable with said plunger in valve chamber 28 to control the flow of condensate from the reservoir to chamber 28 and from the chamber to atmosphere. A spring 58 normally urges the valve members away from each other with their limits of movement with respect to plunger 38 being determined by a pair of spaced abutments comprising respectively a snap ring 60 on the upper end of plunger 38 and a shoulder 56 on the lower end. The respective valves 50, 52 cooperate with valve seats 62, 64 of ports 66, 68 which respectively communicate with the reservoir through aperture 26 and with atmosphere through lateral passages 70 in the casing side wall.

In operation and with the parts of the invention in the position illustrated, valve 50 is open to permit condensate to drain from reservoir 12 into chamber 28 and valve 52 is closed. The piston 34, being in its down position, uncovers the outlet of antifreeze conduit 46 and the cavity 43 is thus filled with antifreeze. When unloading pressure is admitted to the lower side of piston 34 to move it upwardly, spring 58 causes valve 50 to follow the upward movement of the plunger 38 until the former engages seat 62 to close port 66. Immediately thereafter ascending shoulder 56 engages valve 52 and raises it clear of seat 64 so that condensate previously drained from the reservoir into chamber 28 is forcibly ejected to atmosphere through port 68 and passages 70 by reservoir pressure trapped in chamber 28. It will be apparent that in order to prevent the loss of reservoir pressure beyond the capacity of chamber 28 it is essential that both valves be first moved to closed position before either is moved to open position. This is accomplished by spacing the snap ring 60 and shoulder 56 a distance apart which is slightly greater than the distance between the respective valve seats 62, 64.

As the piston moves upwardly under the influence of unloader pressure, antifreeze in space 43 of piston chamber 30 is ejected into the reservoir as above explained. After reservoir pressure has fallen to loading pressure so that the unloader and hence the space beneath piston 54 is exhausted to atmosphere, piston 34 is moved downwardly through the combined action of the springs 58, 36 and the reservoir pressure acting on the upper side of piston 34 to first close valve 52 and then open valve 50. As the piston nears the bottom of its stroke the passage 46 is uncovered and antifreeze again flows into space 43 in readiness for the next upward stroke of the piston.

It will be apparent to those skilled in the art that a proper selection of differential motive areas, valve seat areas, and spring forces must be selected to insure that the total force acting on the bottom of piston 34 exceeds the downward forces acting on the valves and piston when the latter is moved upwardly to the position where both valves are seated and shoulder 56 is in engagement with valve 52. The selection of spring forces and areas of the various members are well within the capabilities of the ordinarily skilled mechanic and specific examples are not considered necessary.

The present invention provides an effective automatic drain for a fluid pressure reservoir which acts in concert with means for injecting antifreeze into the reservoir. For operation during warm seasons, the invention can be utilized solely for draining the reservoir with antifreeze being provided in the supply tank 44 only during cold seasons. It will of course be apparent that the embodiment of the invention shown and described is exemplary only and that the invention is susceptible of various changes and modifications without, however, departing from the scope and spirit of the appended claims.

What is claimed is:

1. In combination with a fluid pressure reservoir, a valve chamber connected to said reservoir and having axially aligned ports respectively communicating with the interior of said reservoir and with atmosphere, a plunger coaxially arranged with respect to said ports, a pair of spaced valve members slideably carried on said plunger each cooperating respectively with one of said ports, spring means normally urging said valve members away from each other, means for reciprocating said plunger, a pair of spaced abutments on said plunger engageable with said valve members for causing one to move to open position and the other to closed position as said plunger is reciprocated with respect to said ports, and means cooperating with said plunger for injecting antifreeze solution into said reservoir upon movement of said plunger in one direction.

2. The combination of claim 1 wherein the spacing between said abutments on said plunger is greater than the spacing between said ports, and wherein said valve members are disposed on said plunger between said abutments, said abutments ensuring that both of said valves are moved to closed position before either is moved to open position.

3. In combination with fluid pressure reservoir, condensate drain means for said reservoir comprising a valve chamber having axially aligned ports respectively communicating with the interior of said reservoir and with atmosphere, a reciprocable plunger projecting axially through both of said ports, a pair of valve members slideably carried on said plunger, spring means normally urging said valve members away from each other, a pair of spaced abutments on said plunger affording stops for said valve members so that as said plunger is reciprocated through said ports one of said valve members is moved to closed position and immediately thereafter the other is moved to open position, a pressure responsive member connected to that end of said plunger which projects through said atmospheric port, spring means normally acting on said pressure responsive member to retain said plunger in a position wherein said valves close said atmospheric port and open said reservoir port, means for admitting fluid pressure to said pressure responsive means so as to move said plunger to a position wherein said valve means close said reservoir port and open said atmospheric port, and means cooperating with said plunger for injecting an antifreeze solution into said reservoir during movement of said plunger to said last named position.

4. A combined condensate drain valve and antifreeze injector in combination with a fluid pressure reservoir comprising a valve chamber having a pair of axially aligned spaced ports respectively communicating with the reservoir and with atmosphere, a pumping chamber coaxially arranged with respect to said valve chamber, a pressure responsive element in said pumping chamber movable between a first and second position, a plunger connected at one end to one side of said pressure responsive element and extending coaxially through said ports into said reservoir, an axial passage in said plunger affording a connection between said reservoir and the space in said pumping chamber adjacent said one side of said element, valve means carried on said plunger for closing said atmospheric port and opening said reservoir port when said element is in its first position and vice versa when said element is in its second position, means for supplying antifreeze to the space adjacent said one side of said element, and means for periodically supplying and exhausting fluid pressure to and from the opposite side of said element for effecting movement thereof between its first and second positions.

5. The combined condensate drain valve and antifreeze injector of claim 4 wherein the antifreeze supply means comprises a pressure-tight supply tank containing antifreeze connected for gravity feed to said pumping chamber and means for subjecting the antifreeze in said tank to the fluid pressure in said reservoir.

6. The combined condensate drain valve and antifreeze injector of claim 4 wherein spring means are arranged to oppose movement of said fluid pressure element to its second position.

7. The combined condensate drain valve and antifreeze injector of claim 4 wherein said valve means comprise a pair of spaced valve members slidingly carried on said plunger, spring means normally urging said valve members away from each other, and spaced abutments on said plunger arranged to permit both of said valve members to close their respective ports before either is moved to open position by movement of said plunger.

References Cited in the file of this patent

UNITED STATES PATENTS

| | | |
|---|---|---|
| 2,330,040 | Fitch | Sept. 21, 1943 |
| 2,509,879 | Pelton | May 30, 1950 |
| 2,535,760 | Sherman | Dec. 26, 1950 |
| 2,619,106 | Wilkerson | Nov. 25, 1952 |
| 2,703,105 | Stoner | Mar. 1, 1955 |